March 17, 1959     B. L. LURIE     2,877,863
AIR FILTER
Filed Sept. 7, 1956     2 Sheets-Sheet 1
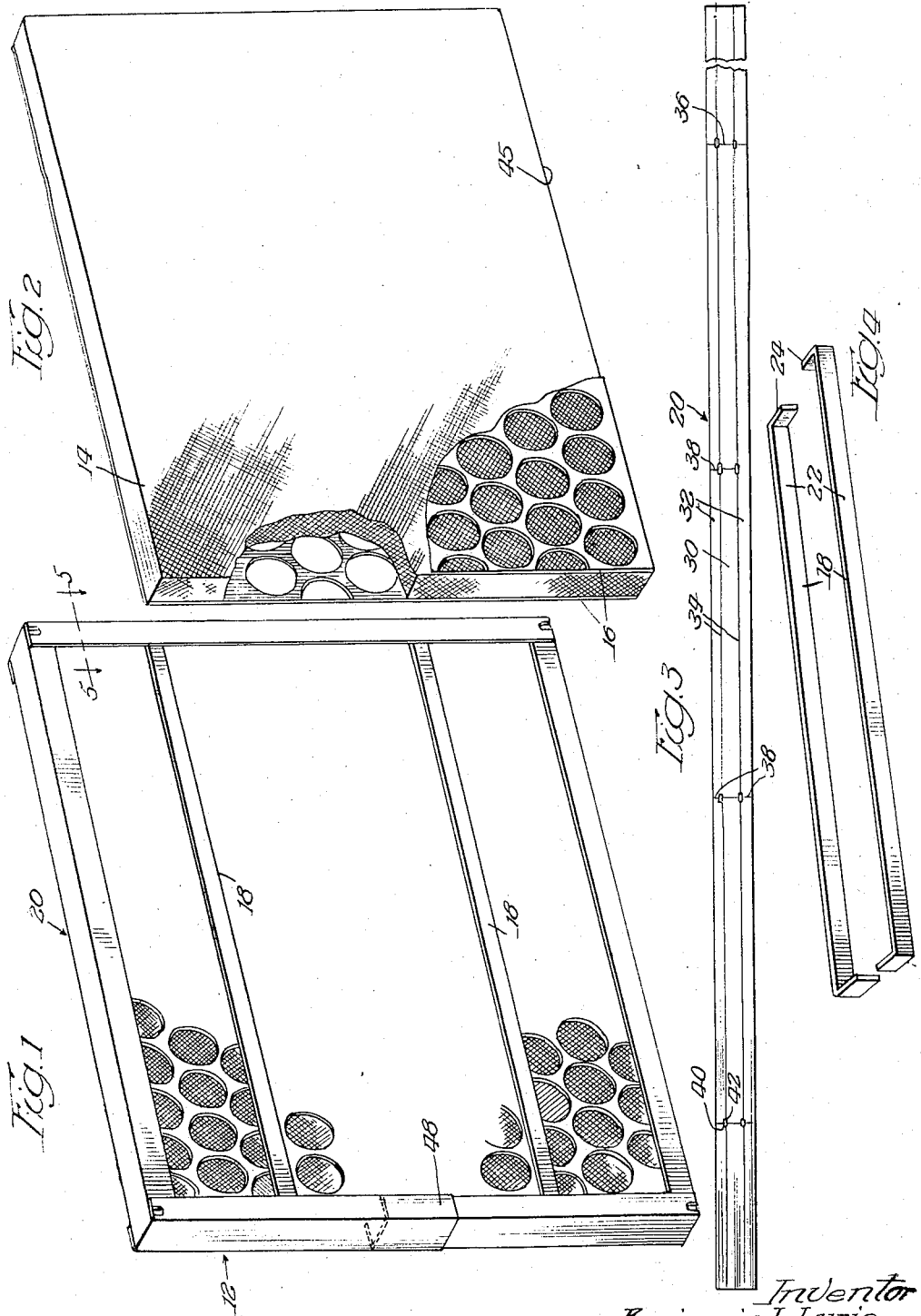

March 17, 1959 — B. L. LURIE — 2,877,863
AIR FILTER
Filed Sept. 7, 1956 — 2 Sheets-Sheet 2
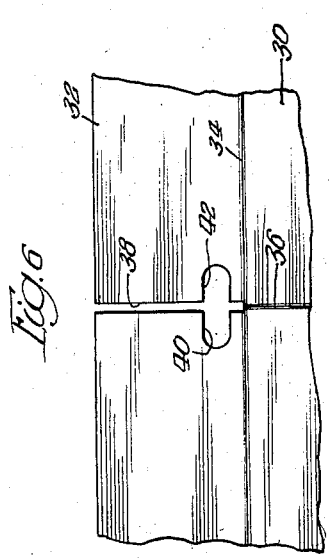
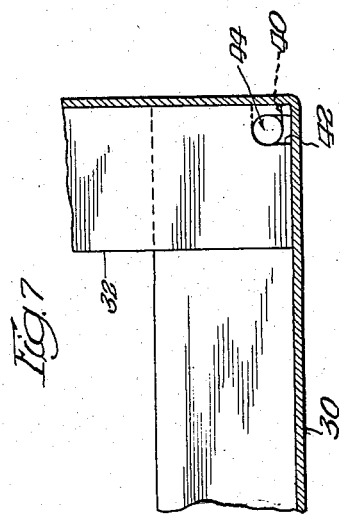
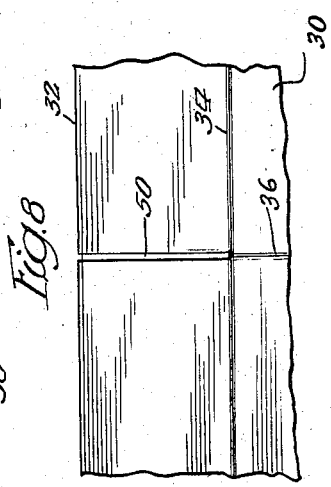
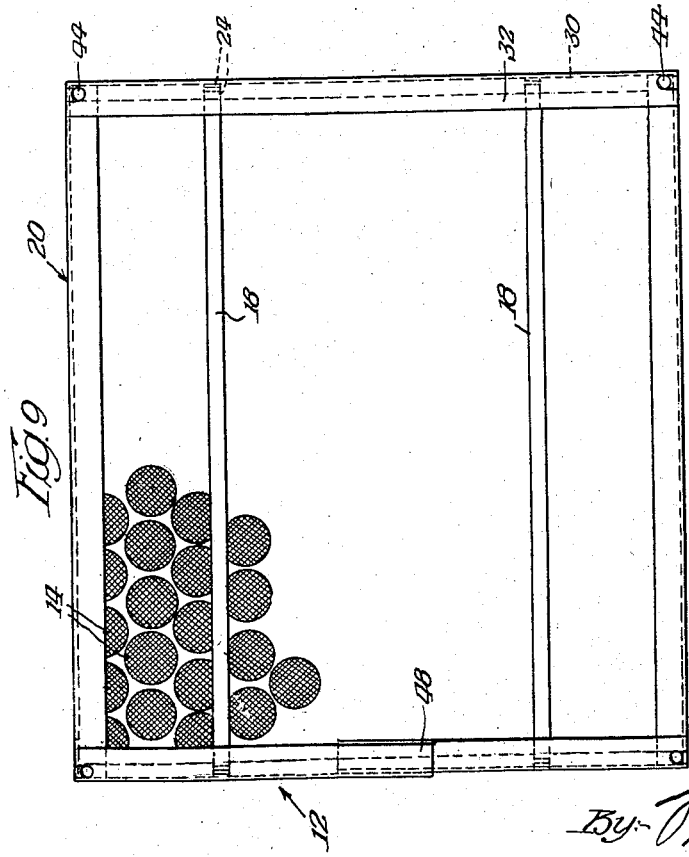
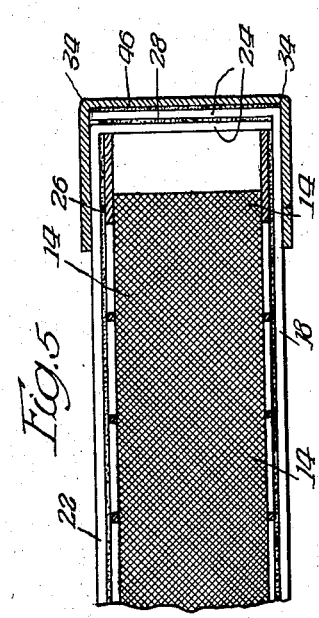
Inventor
Benjamin L. Lurie
By Fred Gerlach
Atty.

ent Office 2,877,863
Patented Mar. 17, 1959

2,877,863
AIR FILTER

Benjamin L. Lurie, Chicago, Ill.

Application September 7, 1956, Serial No. 608,482

1 Claim. (Cl. 183—49)

The present invention relates to an air filter or dust stop, and more particularly such a device as is adapted for use in such apparatus as forced air space heaters and space cold air conditioning units.

An object of the invention is to provide an air filter or dust stop of the foregoing character of novel construction.

Another object is to provide such novel air filter of unusually simple construction, that is rugged and firm, and of throw-away character.

Another object is to provide an air filter or dust stop made up of a number of parts, of such construction and design that the parts can be easily secured together successively in steps in an assembly operation, as by an adhesive material of quick drying nature.

Still another object is to provide an air filter of the foregoing character that lends itself to simple steps in assembly of the parts thereof, whether manually or by machinery.

Other objects and advantages of the invention will appear from the following detail description taken in conjunction with the accompanying drawing in which:

Figure 1 is a perspective view of a filter made according to the present invention, with a portion broken away;

Fig. 2 is a perspective view of the inner portion of the filter, namely, the filter material and side plates, with portions broken away;

Fig. 3 is a plan view of a strip which forms the edge frame;

Fig. 4 is a perspective view of a pair of braces used in the filter;

Fig. 5 is a sectional view taken on line 5—5 of Fig. 1;

Fig. 6 is a plan view on an enlarged scale of a portion of the strip of Fig. 3;

Fig. 7 is a view showing the strip portion of Fig. 6 in folded position;

Fig. 8 is a view similar to Fig. 6 of a modified form of the strip; and

Fig. 9 is a plan view of a completed filter.

Referring in detail to the drawings, the filter made according to the principles of the present invention is shown at 12 in Fig. 1. The filter includes a central core or mass 14 (Fig. 2) of fibrous filtering material or medium of suitable characteristics, such as cellulose pulp, cotton, spun glass, etc., made according to well-known practice. The mass 14 is of generally flat rectangular configuration and has appreciable width in two directions but is of relatively small thickness, thus providing two major faces and four minor faces on the surface thereof.

On opposite sides of the core 14 are perforated plates 15 which also are of well-known kind. These plates are of thin material, e. g., a suitable metal, and have perforations of maximum size consistent with the strength required for the purpose of retaining the core filtering material in place. The perforations should, of course, enable maximum air flow therethrough.

The core 14 and side plates 16 constitute a sandwich which is incorporated in the completed or assembled filter by novel elements. The remaining portions of the completed filter include braces 18 (see Figs. 1 and 4) and an edge frame or border frame 20 (see Figs. 1 and 3).

The braces 18 are in the form of flat wire and include central main lengths 22 and turned over end portions 24. The braces may be made of suitable metal or molded plastic material. The braces 18 are arranged in pairs, the pairs being arranged in parallel relation and spaced apart along a transverse dimension of the filter. The braces 18 in the assembly of the filter are fitted to the outer sides of the side plate 16 and the turned over portions 24 extend over the adjacent edges of the sandwich. The end portions 24 are preferably of such dimension as to overlap or relatively telescope in direction of the thickness of the sandwich, as best shown in Fig. 5. Also, the length of the braces 18 as a whole, i. e., the length of the main portions 22, is such that the end portions 24 are spaced from the respective edges of the sandwich, as also best shown in Fig. 5.

The braces 18 are secured to the sandwich and to each other, in the assembly in the filter, preferably by a quick drying flexible adhesive material, which may be of any well-known type. This adhesive material is placed on the inner surfaces of the main portions 22 of the braces, as at 26, Fig. 5, and when the braces are fitted to the perforated plates the adhesive material secures the braces thereto, and some of the adhesive material engages the core 14 through the perforations in the plates. The adhesive material therefore secures the three elements, namely, filtering material, plates, and braces, firmly together. The adjacent end portions 24 of the braces substantially engage each other, and the meeting or engaged surfaces thereof are secured together by adhesive material of a type indicated above, as indicated at 28, further adding to the firm securement of the elements. The number of pairs of braces 18 may be as desired, as will be understood, two pairs being a suitable number.

The edge frame 20 in keeping with the character of the filter is of inexpensive material, and it is secured to the other portions of the filter in a simple manner. The edge frame, shown in developed view in Fig. 3 is made up of a continuous piece or strip of material such as pressboard or other suitable material. The strip includes a longitudinally extending central portion 30 and side portions 32 divided by score lines or lines of weakness 34 which facilitate folding thereof to form a channel or U-shaped configuration of the strip for application to the filter assembly, as indicated in Figs. 1 and 5. The strip also includes a plurality of other score lines 36 in and extending transversely of the central portion 30, and cuts or lines of severence 38 in the side portions 32 at locations in alignment with the score lines 36 (see Figs. 3 and 6). The cuts 38 are shown exaggerated in width. The score lines 36 and lines of severence 38 facilitate folding of the strip into polygonal shape for surrounding the filter sandwich and the lines of severence 38 enable the side portions 32, which form flanges in the channel shaped folded border, to overlap at the corners of the filter sandwich as shown in Figs. 1 and 7.

The side portions 32 at the lines of severance 38 are provided with notches 40 and 42 respectively extending in from the edges of the cuts, at a location adjacent the longitudinal score line 34 and the central portion 30. These notches 40 and 42 are so relatively arranged that when the strip is folded into polygonal shape (Fig. 1) they together form an aperture 44, as best seen in Fig. 7. Instead of notches 40 and 42, holes having a continuous edge may be formed, but for simplicity of manufacture notches are preferred. When the strip is folded as in Figs. 1 and 7 the two notches together form a hole having such a continuous edge.

The edge frame 20 is applied to the assembly theretofore formed, namely the sandwich including the filter core and side plates and having the braces thereon, and engages the turned over end portions 24 of the braces, and by reason of the spacing of the latter relative to the sandwich, the edge frame portions themselves are spaced from those edges of the filter. On the edges of the sandwich transverse to those just mentioned, the edge frame may and preferably does engage the filtering material and plates. The edge frame is secured to the turned over portions 24 by an adhesive material of the character mentioned above, namely quick drying and flexible, as indicated at 46 in Fig. 5. The edge frame is thus secured to the remaining filter portion at four locations, namely the end portions of the braces. The strip forming the edge frame 20 is preferably arranged so that the end portions thereof, as indicated at 48 in Fig. 1, meet at a position between the pairs of braces so that these end portions, which may otherwise be unsecured, are secured against accidental displacement, by securement to the braces at points adjacent the ends of the strip.

The edge frame may be applied to the filter sandwich by manual operation, but it is also susceptible of application thereto by machinery, and in connection with the latter procedure, the apertures 44 are utilized. These apertures may receive pins or similar elements about which the frame is folded. The apertures 44, it will be noted from Fig. 9, are spaced beyond the perimeter of the central sandwich so that such pins may be inserted therethrough in the assembly operation without hindrance from the inner parts. The apertures are so spaced by reason of the spacing of the end portions 24 of the braces from those edges of the sandwich.

From the foregoing it will be seen that the filter unit including the core 14, side plates 16, and braces 18 may be assembled quickly and in an inexpensive manner. Similarly, the edge frame may be assembled to the previously assembled parts, in a simple and inexpensive manner. Assembly of the filter is facilitated by the use of quick drying flexible adhesive material and it is further facilitated, in a mechanical operation, by the apertures 44 which are positioned outwardly of the confines of the filter sandwich. The use of a continuous piece or strip to form the edge frame facilitates manufacturing and assembling operations.

In the event that it is desired to assemble the parts manually, the notches 40 and 42 and the resulting aperture may be omitted. Such an arrangement is shown in Fig. 8, where the side portion 32 is severed in a straight line 50. This enables the side portions or flanges to overlap when the final channel shaped frame is folded into polygonal shape.

It will be understood that changes may be made in the device illustrated within the scope of the appended claim.

I claim:

A generally flat rectangular air filter comprising in combination a generally rectilinear mass of fibrous material of appreciable width in two directions and of relatively small thickness, a pair of spaced parallel perforated grille plates on opposite main faces of said mass and, in combination with said mass, defining a sandwich-like construction, a rectangular one-piece frame encompassing said sandwich-like construction and extending consecutively along four minor faces of said mass, said frame being channel shape in transverse cross section and having an unbroken web portion folded around three minor faces of the mass in close proximity thereto and folded around the fourth minor face of the mass in overlapping relationship in the medial region of said latter face, and flange portions coextensive with said web portion and extending inwardly of the filter and extending along the outside faces of said grille plates, said flange portions being discontinuous and being overlapped at the corner regions of the filter, said flange portions being formed with opposed registering notches providing axially aligned apertures in the corner regions of said frame, a plurality of pairs of grille-reinforcing braces in the form of flat narrow strips of relatively rigid material extending across the opposite faces of said grille plates on the outside faces thereof in coextensive contact therewith and extending across certain of the perforations in said plates, the strips of each pair being arranged in parallelism and directly opposing each other in the axial direction of air flow through the filter, the end regions of said strips entering between the flange portions of said frame and the outside faces of the grille plates and being turned laterally inwardly of the filter and passing between the web portion of the frame and minor faces of the filter mass with the adjacent inturned portions of each pair of strips overlapping each other coextensively, the extent of said laterally turned portions being substantially equal to the thickness of the air filter, and a coating of adhesive on the inside face of each of said strips and coextensive with said strip whereby the strips are bonded to such portions of the outside faces of said grille plates as oppose the strips, are bonded to the exposed fibrous mass in the vicinity of the grille plate perforations, are bonded to such portions of the minor faces of the fibrous mass as oppose the inturned end portions of the strips, and are bonded to each other in the inturned end regions thereof, and a coating of adhesive disposed between and serving to bond together the outside faces of the laterally turned ends of said strips and the web portions of the rectangular frame.

References Cited in the file of this patent

UNITED STATES PATENTS

| | | |
|---|---|---|
| 2,160,003 | Slayter et al. | May 30, 1939 |
| 2,161,831 | Manning | June 13, 1939 |
| 2,393,419 | Schaaf | Jan. 22, 1946 |
| 2,408,659 | Lamb | Oct. 1, 1946 |
| 2,421,743 | Cartter et al. | June 10, 1947 |
| 2,664,172 | Butterfield | Dec. 29, 1953 |
| 2,675,887 | Gonzales | Apr. 20, 1954 |
| 2,677,436 | Mazek | May 4, 1954 |
| 2,687,781 | Sens | Aug. 31, 1954 |
| 2,715,453 | Lange | Aug. 16, 1955 |